United States Patent [19]

Nakano

[11] Patent Number: 5,837,803
[45] Date of Patent: Nov. 17, 1998

[54] METHOD OF PRODUCING POLYAMIDE RESIN

[75] Inventor: Seiko Nakano, Tsu, Japan

[73] Assignee: M & S Research and Development Co., Ltd., Japan

[21] Appl. No.: 825,500

[22] Filed: Mar. 31, 1997

[30] Foreign Application Priority Data

Apr. 4, 1996 [JP] Japan .................................... 8-082372

[51] Int. Cl.$^6$ ............................ C08G 73/10; C08G 69/00
[52] U.S. Cl. .......................... 528/332; 528/170; 528/176; 528/220; 528/229; 528/272; 528/288; 528/292; 528/310; 528/312; 528/317; 528/322; 528/331; 528/335; 528/336; 528/339
[58] Field of Search ..................... 528/292, 288, 528/272, 220, 229, 310, 322, 332, 331, 335, 336, 170, 176, 312, 317

[56] References Cited

U.S. PATENT DOCUMENTS

| | | | |
|---|---|---|---|
| 4,193,896 | 3/1980 | Cook | 525/437 |
| 4,380,622 | 4/1983 | Chiba | 528/292 |
| 5,306,786 | 4/1994 | Moens et al. | 528/332 |

OTHER PUBLICATIONS

Die Makromolekulare Chemie 126 (1969) pp. 217–230, "Mechanochemische Synthesen durch Polykondensation mit Polyestern als Grundsubstanz". The month in the date of publication is not available.

European Polymer Journal, 1974, vol. 10, pp. 61–70, "Syntheses of New Polymers by Destructive Methods". The month in the date of publication is not available.

Die Makromolekulare Chemie 175 (1974) pp. 371–389, "Mechanochemische Synthesen durch Polykondesation mit Polyestern als Gundsubstanz, 3$^*$)". The month in the date of publication is not available.

Chemistry Express, vol. 4, No. 5, pp. 353–356 (1989), Kinki Chemical Society, Japan. The month in the date of publication is not available.

"Sen–i Gakkai Shi", vol. 31, No. 7 (1975), pp. 39–47, Aminolysis of Poly(Ethylene Terephthalate). The month in the date of publication is not available.

*Primary Examiner*—P. Hampton-Hightower
*Attorney, Agent, or Firm*—Parkhurst & Wendel, L.L.P

[57] ABSTRACT

A method of producing a polyamide resin by reacting 1 mol of linear polyester resin (as calculated in repeating unit of the linear polyester resin) consisting of at least one dicarboxylic acid component and at least one diol component and having an intrinsic viscosity of not less than 0.2 dl/g with 0.5–1.5 mol of at least one diamine compound in a reaction medium comprising at least one solvent which is selected from the group consisting of hydrocarbons, halogenated hydrocarbons, ethers and acetals, so that the diol component of the linear polyester resin is substituted by the diamine compound to provide the polyamide resin as a reaction product.

15 Claims, 4 Drawing Sheets

METHOD OF PRODUCING POLYAMIDE RESIN

BACKGROUND OF THE INVENTION

1. Field of the Invention

The present invention relates in general to a method of producing a polyamide resin. More particularly, the invention is concerned with such a method of producing the polyamide resin by using a linear polyester resin.

2. Related Art

Nylon 66, 46, 6T and an aramide resin have been mass-produced as a heat-resistant polyamide resin which exhibits excellent mechanical, chemical and physical properties. In general, these nylon 66, 46, 6T and etc. are produced by dehydration and polycondensation of a nylon salt which is obtained by reaction of an organic dicarboxylic acid and an organic diamine. However, this method requires cumbersome process steps and the polycondensation needs to be effected at a high temperature for a long period of time. In producing the aramide resin, there are some problems: use of expensive organic dicarboxylic dihalide; corrosion of the reaction device due to halogen; difficulty in recycling the material; and contamination of the environment.

As is well known, an amine compound reacts with an ester compound in water or alcohol to provide an amide compound ("Fieser & Fieser Organic Chemistry" pp. 167–168, Japanese Edition, published by MARUZEN CO., Ltd.). Further, it is known that the amine compound reacts with a polyester resin, in particular, a widely known polyethyleneterephthalate resin (hereinafter referred to as "PET resin") for the following purposes.

For instance, C. Simionescu et al. propose a method for producing a novel polymer by reacting a diamine compound with a radical which is generated by cutting a molecular chain of the PET resin by mechanical means or by using radial rays. In this method, however, a large amount of the diamine compound is used for the reaction with the radical. Since the cutting of the molecular chain of the PET resin is positively effected, this method is not satisfactory for providing the polyamide resin which has a high degree of polymerization suitable for practical use. [Makromol. Chem., 126, 217 (1969), Europ. Polym. J., 10, 61 (1974), Makromol. Chem., 175, 371 (1974)].

In JP-A-50-105914, the PET resin is made fibrous by reaction with a large amount of the diamine compound after the PET resin is dissolved in a solvent. The fibrous PET resin is treated with a metallic salt for forming a complex salt, so that the molecules of the fibrous PET resin are cross-linked for increasing the molecular weight thereof.

Yoshida et al. teach a technique of improving the surface of the PET resin using the diamine compound by immersing the PET resin in a solvent such as water, ethanol or benzene. However, since the amount of the diamine compound is small, the entirety of the PET resin is not converted into the polyamide resin [Chemistry Express, Vol. 4, No. 5, p.353 (1989)].

Yamasaki et al. analyze a mechanism of reaction between the PET resin and various kinds of amine compounds for the purpose of examining the degradation reaction. However, they do not teach the formation of useful polyamide resin ["Sen-i Gakkai Shi", Vol. 31, No. 7, p.39 (1975)].

The PET resin is a widely-used plastic for providing fiber, films, bottles and injection molding materials. It is expected that the amount of consumption of the PET resin will further increase in the future. At the same time, the waste PET resin will give rise to a serious problem.

Generally speaking, the recycling of the waste does not pay since the product reclaimed from the waste has lowered quality as compared with the original product, and the recycling costs much during the process of collection, classification and reclaiming of the waste. In view of this, it will be very useful if the waste could be recycled at a lowered cost so as to provide the reclaimed product having a high added value.

SUMMARY OF THE INVENTION

The present invention was developed in view of the above situations. It is therefore an object of the invention to provide a novel method of producing a polyamide resin, in particular, a heat-resistant polyamide resin, having high molecular weight suitable for practical use as well as high degrees of yield and amidation ratio, by utilizing a polyester resin, in particular, a recycled polyethyleneterephthalate (PET) resin.

The above object of the present invention may be attained according to a first aspect of the invention which provides a method of producing a polyamide resin by reacting 1mol of linear polyester resin (as calculated in repeating unit of said linear polyester resin) consisting of at least one dicarboxylic acid component and at least one diol component and having an intrinsic viscosity of not less than 0.2 dl/g with 0.5–1.5 mol of at least one diamine compound in a reaction medium comprising at least one solvent which is selected from the group consisting of hydrocarbons, halogenated hydrocarbons, ethers and acetals, so that the diol component of the linear polyester resin is substituted by the diamine compound to provide the polyamide resin as a reaction product.

According to the present method for producing the polyamide resin as described above, the linear polyester resin which is used in place of the organic dicarboxylic acid conventionally used for producing the polyamide resin reacts, in the predetermined reaction medium, with the diamine compound whose molar ratio is determined to be in the range of 0.5–1.5 for the polyester resin, whereby the desired polyamide resin is advantageously obtained in a simplified manner in a relatively short period of time.

In a first preferred form of the above first aspect of the present invention, the method further comprises a step of effecting polycondensation under solid state or molten state so as to increase a degree of polymerization of the reaction product. This arrangement provides the polyamide resin having a high intrinsic viscosity suitable for practical use.

In a second preferred form of the first aspect of the present invention, the method further comprises a step of removing the diol component from a reaction system of the linear polyester resin and the diamine compound, which diol component is produced as a by-product during a reaction of the linear polyester and the diamine compound. According to this arrangement, the diol component produced as a by-product during the reaction is removed from the reaction system, to thereby increase an amidation ratio and a molecular weight (intrinsic viscosity) of the formed polyamide resin, so that the polyamide resin having a high molecular weight is easily obtained.

In a third preferred form of the first aspect of the present invention, a total content of water contained in a reaction system of the linear polyester resin, the diamine compound and the reaction medium is controlled to not more than 1000 ppm for the linear polyester resin. According to this arrangement, the total water content of the reaction system, i.e., the sum of the water contents of the linear polyester resin, diamine compound and reaction medium, is controlled to not more than 100 ppm for the linear polyester resin. In this arrangement, hydrolysis of the polyester resin which would be otherwise caused by the water present in the reaction system is reduced, so that the reaction for amidation of the polyester resin effectively proceeds, thereby providing the desired polyamide resin having a high molecular weight while avoiding gelation of the polyamide resin to be obtained.

BRIEF DESCRIPTION OF THE DRAWINGS

The above and optional objects, features, advantages and technical and industrial significance of the present invention will be better understood by reading the following description of a presently preferred embodiment of the invention, in connection with the accompanying drawings, in which.

DETAILED DESCRIPTION OF THE PREFERRED EMBODIMENT

Figure 1:
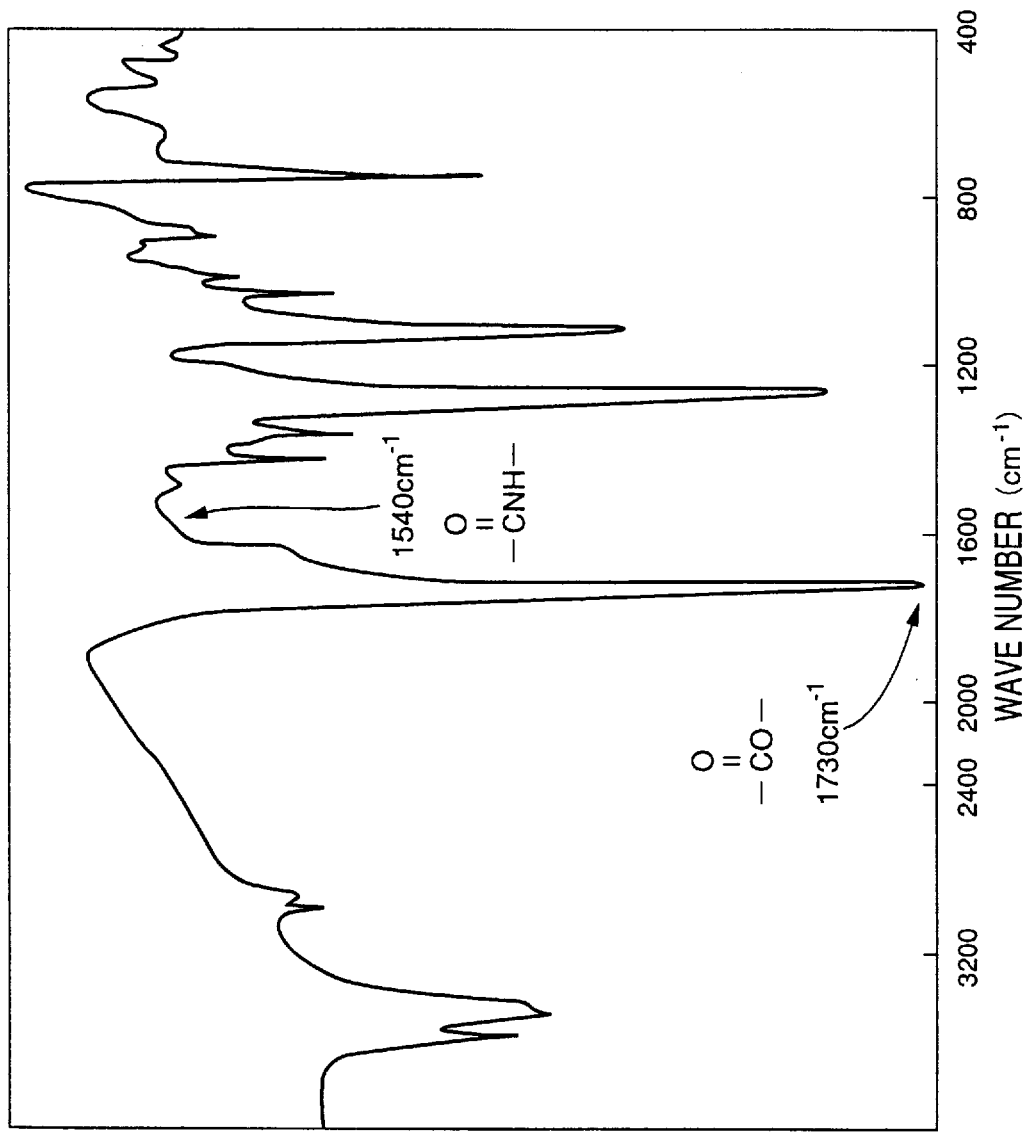
FIG. 1 is a view showing an FT-IR spectrum of the PET resin obtained by pulverizing the commercially available bottle made of the PET resin.

The linear polyester resin used in the method of producing the polyamide resin according to the present invention is obtained by polycondensation of a dicarboxylic acid component formed of an organic dicarboxylic acid or its derivative, and a diol component formed of a dihydric alcohol compound or dihydric phenol compound. Examples of the organic dicarboxylic acid or its derivative are: an aromatic dicarboxylic acid and its derivative such as terephthalic acid, isophthalic acid, phthalic acid, dimethyl terephthalate, terephthalic acid dichloride, diphenyl dicarboxylic acid or naphthalene dicarboxylic acid; and an aliphatic dicarboxylic acid and its derivative such as oxalic acid, succinic acid, adipic acid, sebacic acid, maleic acid and fumaric acid. Examples of the dihydric alcohol compound are: alkylene glycol such as ethylene glycol, propylene glycol, butane-1, 3-diol, butane-1, 4-diol and tetramethylene glycol; and cyclohexanediol. As the dihydric phenol compound, bisphenol-A is used, for instance. Any one of, or any combination of, those dicarboxylic acid components may be used. Similarly, any one of, or any combination of, the diol components as described above may be used.

In the present embodiment, it is preferable to use, as the linear polyester resin, a polyalkyleneterephthalate resin which is formed of the terephthalic acid as the dicarboxylic acid, and the alkylene glycol as the dihydric alcohol, such as ethylene glycol, butane-1, 4-diol. It is more preferable to use a polyethyleneterephthalate resin (hereinafter referred to as "PET resin"), in particular, a recycled PET resin.

In the present invention, two or more of the linear polyester resins may be used in combination. Further, the linear polyester resin may contain an organic polymer or an inorganic compound.

Examples of the organic polymer contained in the polyester resin are polyethylene, polypropylene, ethylene-propylene copolymer, ethylene-vinyl acetate copolymer, chlorinated polyethylene, polybutadiene, butyl rubber, polystyrene, styrene-acrylonitrile-butadiene copolymer, polyvinyl chloride, polyoxymethylene, polyamide and polyphenylene oxide. Examples of the inorganic compound are talc, mica, calcium carbonate, titanium oxide, carbon black, alumina, glass beads, glass fiber and carbon fiber.

The intrinsic viscosity or limiting viscosity number of the linear polyester resin used in the present invention needs to be adjusted to not less than 0.2 dl/g, preferably not less than 0.3 dl/g, as measured at the temperature of 30° C. by using hexafluoroisopropanol (hereinafter referred to as "HFIP") as the solvent. The intrinsic viscosity of the linear polyester resin lower than the lower limit of 0.2 dl/g undesirably lowers the intrinsic viscosity of the polyamide resin to be obtained. In this case, the polymerization degree of the polyamide resin is not sufficiently increased even after the polyamide resin is subjected to the polycondensation under solid state (hereinafter referred to as "solid-polycondensation") or the polycondensation under molten state (hereinafter referred to as "melt-polycondensation"). Therefore, the obtained polyamide resin does not have an industrially effectively high molecular weight.

Though the shape of the polyester resin used in the present invention is not particularly limited, it is preferable that the polyester resin be in the form of powder having an average grain size of not larger than 2 mm, more preferably not larger than 1 mm. The content of water contained in the polyester resin (water content) is generally controlled to not more than 1000 ppm, preferably not more than 500 ppm, more preferably not more than 100 ppm, so that the total water content in the reaction system of the linear polyester resin and the diamine compound is easily controlled to be lower than the specified level.

Examples of the diamine compound which reacts with the linear polyester resin are the following: aliphatic diamines such as ethylene diamine, trimethylene diamine, tetramethylene diamine, pentamethylene diamine, hexamethylene diamine, octamethylene diamine, dodecamethylene diamine, trimethylene-1 and 6-hexamethylene diamine; aromatic diamines such as p-phenylene diamine, m-phenylene diamine, o-phenylene diamine, 2,3-tolylene diamine, 2,4-tolylene diamine, 2,5-tolylene diamine, 2,6-tolylene diamine, 3,4-tolylene diamine, 3,5-tolylene diamine, p-xylylene diamine, m-xylylene diamine, o-xylylene diamine, 4,4'-diamino diphenyl methane, 4,4'-diamino biphenyl, 3,3'-dimethyl-4,4'-diamino biphenyl, 3,3'-dichloro-4,4'-diamino biphenyl, 4,4'-diamino diphenyl ether, 4,4'-diamino diphenyl propane, 4,4'-diamino diphenyl sulfone, 4,4'-diamino diphenyl sulfide, 4,4'-diamino benzanilide, 3,3'-dimethyl-4,4'-diamino diphenyl methane, 3,3'-diethyl-4,4'-diaminodiphenylmethane, 4,4-diamino anthraquinone, 3,3'-dimethoxybenzidine, α,α'-bis(4-aminophenyl)-p-isopropylbenzene, 1,5-diamino naphthalene, and 2,6-diamino naphthalene; alicyclic diamines such as 1,2-diamino cyclohexane, 1,3-diamino cyclohexane, 1,4-diamino cyclohexane, 1,3-bis (aminomethyl)cyclohexane, isophorone diamine, piperazine, 2,5-dimethyl piperazine, bis(4-aminocyclohexyl)methane, bis(4-aminocyclohexyl) propane, 4,4'-diamino-3,3'-dimethyl dicyclohexylmethane, α,α'-bis(4-aminocyclohexyl)-p-diisopropylbenzene, α,α'-bis(4-aminocyclohexyl)-m-diisopropylbenzene or menthane diamine; and amino-modified polymer such as diamino polysiloxane. Any one of, or any combination of, the diamine compounds as described above may be used.

The water content in the diamine compound is generally controlled to not more than 1000 ppm, preferably not more than 500 ppm, more preferably not more than 100 ppm, for easily controlling the total water content in the reaction system to the specified level.

The amount of the diamine compound used in the reaction according to the present invention needs to be in a range of 0.5–1.5 mol, preferably in a range of 0.7–1.3 mol, more preferably in a range of 0.8–1.2 mol, for 1 mol of the linear polyester resin as calculated in repeating unit. If the amount of the diamine compound is less than 0.5 mol, the obtained polyamide resin does not exhibit satisfactory heat resistance. On the other hand, if the amount of the diamine compound exceeds the upper limit of 1.5 mol, the molecular weight of the obtained polyamide resin is undesirably low, or the polyamide resin tends to be gel which is insoluble and infusible after the polyamide resin is subjected to the solid-polycondensation or melt-polycondensation.

The reaction medium used in the amidation reaction between the linear polyester resin and the diamine compound is selected from the following solvents: aliphatic, aromatic, aliphatic-aromatic, or alicyclic hydrocarbons such as n-butane, i-butane, n-pentane, 2-methylbutane, 2,2-dimethylpropane, n-hexane, 2-methylpentane, 3-methylpentane, 2,2-dimethylbutane, 2,3-dimethylbutane, n-heptane, 2-methylhexane, 3-methylhexane, 2,3-dimethylpentane, n-octane, n-nonane, n-decane, isodecane, n-tridecane, benzene, toluene, xylene, ethylbenzene, cumene, n-propylbenzene, isopropylbenzene, n-butylbenzene, n-octylbenzene, dodecylbenzene (linear, branched), diethylbenzene, cyclopentane, cyclohexane, decalin, tetralin, methylcyclopentane and methylcyclohexane; halogenated hydrocarbons such as 1,2-dichloroethane, 1,1,1-trichloroethane, chlorobenzene, p-chlorotoluene, o-dichlorobenzene, m-dichlorobenzene, p-dichlorobenzene, 3,4-dichlorotoluene and 1,2,3-trichlorobenzene; and ethers and acetals such as diethylether, dipropylether, dibutylether, dihexylether, ethylvinylether, butylvinylether, anisole, phenetole, butylphenylether, pentylphenylether, methoxytoluene, benzylethylether, diphenylether, dibenzylether, 2-methylfuran, tetrahydrofuran, 1,2-dimethoxyethane, 1,2-diethoxyethane, 1,2-dibutoxyethane, diethyleneglycoldibutylether and diethylacetal.

Any one of, or any combination of, the solvents as described above may be used. In the present invention, petroleum ether, petroleum benzene, gasoline, kerosene or solvent naphtha may be used as the reaction medium. However, it is not preferable to employ, as the reaction medium of the present invention, aldehyde, ketone, ester, carboxylic acid, alcohol or phenol solvent and water which are usually used as the solvent since these solvents tend to react with the diamine compound or hydrolyze the polyester resin.

For the purpose of removing, from the reaction system, the diol component separated from the polyester resin by substitution with the diamine compound, it is preferable to select the reaction medium having a boiling point which is higher than that of the diol component to be removed. It is more preferable to select the reaction medium whose boiling point is higher than that of the diol component by at least 10° C.

The content of water contained in the solvent, i.e., in the reaction medium, is adjusted to not more than 1000 ppm, preferably not more than 500 ppm, more preferably not more than 100 ppm, for easily controlling the total water content in the reaction system to the specified level.

The amount of the reaction medium is 200–500 parts by weight, preferably 500–3000 parts by weight, per 100 parts by weight of the polyester resin. If the amount of the reaction medium is less than 100 parts by weight, the polyester resin is not sufficiently dispersed in the reaction medium, the reaction does not proceed homogeneously. On the other hand, the amount of the reaction medium exceeding the upper limit of 5000 parts by weight makes the reaction system dilute, so that the reaction of the polyester resin and the diamine compound does not sufficiently proceed.

For the amidation of the linear polyester resin according to the present invention, the total content of water contained in the reaction system is adjusted to not more than 1000 ppm, preferably not more than 500 ppm, more preferably not more than 100 ppm, for the linear polyester resin. According to this arrangement, the polyester resin is not likely to be hydrolized by water contained in the reaction system, so that the amidation of the polyester resin effectively proceeds so as to provide the polyamide resin having a high molecular weight.

The total water content in the reaction system may be controlled to the specified level by using predetermined amounts of the materials whose water contents have been respectively adjusted in a known manner. Alternatively, some of the predetermined amounts of the materials are mixed, and the water content of the mixture is suitably adjusted for controlling the total water content in the reaction system.

In the present invention, it is preferable to use the linear polyester resin, the diamine compound and the reaction medium whose water contents are respectively adjusted to not more than 1000 ppm. The water contents of these materials may be adjusted according to a known manner. For instance, the polyester resin is dried under reduced pressure or dried by heat treatment, so that the water content of the polyester resin is adjusted to not more than 1000 ppm. The water contents of the diamine compound and the reaction medium are adjusted, for instance, by dissolving the diamine compound in the reaction medium to provide a mixture, and the obtained mixture is held in contact with a suitable adsorbent such as molecular sieve so that the mixture is dehydrated.

In producing the polyamide resin by using the linear polyester resin according to the present invention, the polyester resin and the diamine compound as the reaction materials, and the suitably selected solvent as the reaction medium are put into a suitable container having stirring or agitating means, and heated. In this case, the polyester resin reacts with the diamine compound while it is dispersed in the form of a slurry which is not dissolved in the reaction medium, in other words, in the form of heterogeneous system. Alternatively, the polyester resin may react with the diamine compound while it is dissolved in the reaction medium by heating. The polyamide resin obtained after the reaction is in the form of slurry which is not dissolved in the reaction medium during heating. For effecting the amidation, either the batch method or continuous method is suitably employed.

The temperature at which the amidation reaction is effected varies depending upon reaction pressure, reaction time, agitating state of the mixture in the container and the shape of the polyester resin, in addition to the kinds and amounts of the polyester resin, diamine compound and solvent to be used. In general, the reaction temperature is higher than 100° C. and lower than the melting point of the polyester resin to be used. Preferably, the reaction temperature is higher than 120° C. and lower than the melting point of the polyester resin by at least 10° C. If the reaction temperature is lower than 100° C., it requires a relatively long time to form the polyamide resin. On the other hand, the reaction temperature above the melting point of the polyester resin may cause some problems. For example, the formed polyamide resin tends to strongly adhere to the inner wall of the container and the polyamide resin is likely to be gel which is insoluble and infusible.

When the reaction temperature is higher than the boiling point of the solvent to be used (as the reaction medium) or the diamine compound, the above reaction is effected while the container is pressure-tightly closed or under pressure.

Like the reaction temperature as described above, the reaction time required for producing the polyamide resin according to the present invention varies depending upon various factors. In general, the reaction time is in a range of 0.5 hour–100 hours, preferably in a range of 1 hour–50 hours. If the reaction time is less than 0.5 hour, the formation of the polyamide resin is insufficient. On the other hand, the reaction time exceeding 100 hours does not significantly increase the formation of the polyamide resin. Further, the polyamide resin to be produced tends to be gel which is insoluble and infusible.

In the present invention, the diol component produced as a by-product during the reaction for producing the polyamide resin, in other words, the diol component which is separated from the polyester resin by the substitution with the diamine compound, is preferably removed from the reaction system, so that the reaction effectively proceeds so as to produce the polyamide resin whose molecular weight is sufficiently increased.

The above-described diol component as the by-product of the reaction may be removed by simply opening the container provided that the intended diol component is removed from the reaction system. Alternatively, the diol component may be taken out of the container by suitable means. For instance, the container is evacuated to a reduced pressure by known evacuating means, so that the diol component is taken out of the container. In this method, the container is evacuated to a pressure of not more than 500 Torr, preferably not more than 300 Torr. It is desirable that the container be kept under the reduced pressure at a temperature of 150° C.–250° C. for 0.5 hour–50 hours.

The diol component may be vaporized by heating the container at a temperature which is higher than the boiling point of the diol component. In this case, the container is heated at a temperature which is higher than the boiling point of the diol component by at least 10° C., preferably for 0.5 hour–50 hours.

The operation for removing the diol component according to the present invention is effected preferably after the addition of the diamine compound to the polyester resin is terminated. According to this arrangement, the diamine compound is not removed together with the diol component as the by-product before it reacts with the polyester resin so that the diamine compound is effectively utilized, thereby assuring efficient production of the desired polyamide resin.

When the reaction for producing the polyamide resin is terminated, the polyamide resin as a reaction product which is dispersed in the form of slurry in the reaction medium is separated and collected therefrom, according to a known method such as filtration, centrifugation or drying the reaction medium by spraying. The thus obtained polyamide resin is completely dried by hot gas drying or vacuum drying, to thereby provide a desired polyamide resin having an intrinsic viscosity of not less than 0.3 dl/g.

The polyamide resin as the reaction product obtained as described above is advantageously subjected to the solid-polycondensation or the melt-polycondensation for further increasing its molecular weight. By effecting the solid-polycondensation or the melt-polycondensation, the intrinsic viscosity of the obtained polyamide resin can be increased to 0.5 dl/g or higher, further, 2 dl/g or higher.

Described more specifically, the solid-polycondensation is effected for increasing the degree of polymerization of the obtained polyamide resin while it is kept in a solid phase. More specifically, the polyamide resin is heated to a temperature within a range between a temperature which is 50° C. higher than the glass-transition temperature of the polyamide resin and the melting point of the polyamide resin, preferably in a range between a temperature 80° C. higher than the glass-transition temperature and a temperature 20° C. lower than the melting point of the polyamide resin. This heat treatment is effected under reduced pressure of not more than 1000 Pa, preferably not more than 300 Pa, or in the presence of an inert gas. Although the time period during which the heat treatment is effected varies depending on the temperature, the amount of the polyamide resin as the reaction product and the shape of the device to be used, it is preferable to effect the heat treatment for 0.2 hour–20 hours, more preferably 0.5 hour–10 hours.

The melt-polycondensation is effected for increasing the degree of polymerization of the obtained polyamide resin while it is kept in a molten state, such that a shearing force is applied to the molten polyamide resin while it is kept at reduced pressure. The shearing force is applied to the molten polyamide resin at a temperature within a range between a temperature higher than the melting point of the polyamide resin as the reaction product and a temperature lower than the decomposition temperature of the polyamide resin, preferably in a range between a temperature higher than the melting point of the polyamide resin as the reaction product by at least 20° C. and a temperature lower than the decomposition temperature of the polyamide resin by at least 30° C. The melt-polycondensation in which the shearing force is applied to the molten polyamide resin is effected by using any suitable device which is capable of kneading a polymer having a high viscosity under the heating condition, such as a roll, extruder or kneader. It is preferable to use a vent-type extruder or a kneader which assures easy kneading of the polymer under reduced pressure, permits the molecular weight of the polymer to sufficiently increase in a relatively short period of time and facilitates retrieval of the polyamide resin. As the extruder, a single-screw or multi-screw extruder is used. The reaction by-product is removed through the vent of the extruder under reduced pressure. Thus, the polyamide resin having a high molecular weight is easily obtained in the form of pellets in a short period of time. The reduced pressure is not more than 1000 Pa, preferably not more than 300 Pa. The molten resin is subjected to the shearing force for 0.2 minute–15 minutes, preferably for 0.5 minute–10 minutes.

To the polyamide resin obtained as described above, there are added, as needed, various additives such as a heat stabilizing agent, a light stabilizing agent, a coloring agent, a lubricant, a reinforcing agent and a filler. Then, the polyamide resin is formed into a desired product according to a known molding method, such as compression molding, injection molding or extrusion. The polyamide resin may be used for forming a film by casting, or a coating layer while the polyamide resin is dissolved in a suitable solvent.

EXAMPLES

To further clarify the present invention, there will be described some examples of the present invention. It is to be understood that the present invention is not limited to the details of the following examples, but may be embodied with various changes, modifications and improvements which may occur to those skilled in the art without departing from the scope of the present invention defined in the attached claims.

<Preparation of specimens of the PET resin having different intrinsic viscosity values>

There were prepared specimens of the PET resin powder having different intrinsic viscosity in the following manner. Initially, commercially available bottles made of the PET resin were collected and washed. Then, the PET bottles were pulverized and passed through a 10-mesh sieve. The thus obtained PET resin which passed through the sieve had an intrinsic viscosity of 0.65 dl/g and a melting point (Tm) of 251° C. (This PET resin is hereinafter referred to as "a recycled PET resin".) 70 g of the obtained PET resin was introduced into respective three autoclaves together with 300 g of water. Then, the autoclaves were pressure-tightly closed and heated while the mixtures in the autoclaves were stirred. The mixtures were held at respectively different temperatures for 10 hours for hydrolysis of the PET resin. Thereafter, the temperature in each autoclave was lowered to room temperature. Each of the hydrolyzed PET resin obtained as described above was subjected to vacuum drying at 120° C. after it was subjected to filtration, so as to provide three specimens (a)–(c) of the PET resin.

The three specimens (a)–(c) of the PET resin obtained as described above by hydrolysis at different temperatures indicated below had the following intrinsic viscosity.

|  | Hydrolysis temperature (°C.) | Intrinsic viscosity ([η]dl/g) |
|---|---|---|
| specimen (a) | 150 | 0.32 |
| (b) | 160 | 0.21 |
| (c) | 170 | 0.12 |

The intrinsic viscosity was measured at a temperature of 30° C. by using the Ubbelohde viscometer, using HFIP as a solvent. The melting point (Tm) was measured by using the TGA thermal analyzer ("SSC/5200, TG/DTA220" available from SEIKO CO., Ltd., Japan) in an atmosphere of nitrogen with a temperature rise at a rate of 10° C./minute.

<Examples 1–4 and Comparative examples 1–2>

There were obtained polyamide resins according to Examples 1 and 2 by respectively using a commercially available PET resin powder having an intrinsic viscosity of 0.80 dl/g ("J120" available from MITSUI PET JUSHI CO., Ltd, Japan), and the recycled PET resin obtained by pulverizing the collected PET bottles as described above and having an intrinsic viscosity of 0.65 dl/g. In Examples 3 and 4 and in Comparative example 1, the three specimens of the PET resin (a), (b) and (c) obtained by hydrolysis as described above were respectively used. Each of the PET resin materials was dried at 130° C. for three hours. The water content of each of the PET resin materials measured by a water content measuring device (available from MITSUBISHI KAGAKU CO., Ltd., Japan) was substantially in a range of 100 ppm–300 ppm. Then, 110 g of the PET resin materials prepared as described above were respectively introduced into 1 L autoclaves together with 66 g of hexamethylenediamine (hereinafter referred to as "HMD") which is an equivalent molar amount for the PET resin as calculated in repeating unit of the PET resin and which is available from WAKO JUNYAKU CO. Ltd., Japan, and 667 g of o-dichlorobenzene (hereinafter referred to as "ODCB") available from WAKO JUNYAKU CO. Ltd. The atmosphere in each autoclave was substituted with the nitrogen gas. After each autoclave was pressure-tightly closed, the mixture in the autoclave was heated while it was stirred. The mixture was held at 180° C. for ten hours. Thereafter, the temperature of the autoclave was lowered to room temperature. After the obtained reaction product was subjected to filtration, it was washed with a large amount of ethanol. Then, the reaction product was again subjected to filtration, and vacuum-dried at 120° C. at a reduced pressure of 1 Torr for 24 hours. In Comparative example 2, dimethyl terephthalate was used in place of the PET resin. The polyamide resin was obtained in the same manner as described above.

FT-IR spectrum analysis of the thus obtained reaction product in the form of powder revealed that the absorption wave number band of the ester is reduced or substantially eliminated and the absorption wave number band of the amide appears. Thus, it was confirmed that the diol component in the PET resin was substituted by the diamine compound, in other words, the PET resin was formed into the polyamide resin. Each of the polyamide resins (A) obtained in the above Examples 1–4 and Comparative examples 1–2 was examined of its yield and various physical properties. The results are shown in TABLE 1.

Each of the obtained polyamide resins (A) was subjected to polycondensation for increasing the degree of polymerization according to the following two methods.

<solid-polycondensation>

1 g of each polyamide resin (A) was put into a glass bottle, and subjected to the solid-polycondensation at 200° C. for 3 hours at a reduced pressure of 1 Torr. The physical properties of the thus obtained polyamide resins (B) are also indicated in TABLE 1.

<melt-polycondensation>

Each polyamide resin (A) was subjected to the melt-polycondensation for 2 minutes under a reduced pressure of 1 Torr while the shearing force was applied thereto. Described in detail, the melt-polycondensation was effected by using a double-screw extruder having a 15 mmφ-vent ("MP-2015" (L/D=15) available from APV Chemical Machinery Inc.). The cylinder temperature of the extruder was 350° C. Thereafter, the polyamide resin was extruded in a strand form, and cut into pellets after it was cooled. The physical properties of the thus obtained polyamide resins (C) are also indicated in TABLE 1.

TABLE 1

|  |  |  | Examples |  |  |  | Comparative examples |  |
|---|---|---|---|---|---|---|---|---|
|  |  |  | 1 | 2 | 3 | 4 | 1 | 2 |
| intrinsic viscosity [η] |  |  | 0.80 | 0.65 | 0.32 | 0.21 | 0.12 | 0.03 |
| Poly-amide resin | A | yield (g) | 143 | 145 | 137 | 130 | 115 | 102 |
|  |  | (% *1) | (101) | (103) | (97) | (92) | (82) | (72) |
|  |  | amidation ratio *2 | 0.94 | 0.93 | 0.92 | 0.90 | 0.88 | 0.80 |
|  |  | intrinsic viscosity [η] | 0.43 | 0.40 | 0.30 | 0.25 | 0.10 | 0.15 |
|  |  | melting point Tm *3 (°C.) | 301 | 300 | 298 | 295 | 280 | 240 |
|  | B | intrinsic viscosity [η] | 0.61 | 0.54 | 0.41 | 0.33 | 0.12 | 0.16 |
|  |  | melting point Tm (°C.) | 305 | 301 | 300 | 299 | 285 | 242 |

TABLE 1-continued

|  |  | Examples | | | | Comparative examples | |
|---|---|---|---|---|---|---|---|
|  |  | 1 | 2 | 3 | 4 | 1 | 2 |
| C | intrinsic viscosity [η] | 1.12 | 0.98 | 0.65 | 0.50 | 0.19 | 0.18 |
|  | melting point Tm (°C.) | 310 | 305 | 305 | 301 | 289 | 244 |

*1: percentage obtained by dividing the yield (g) by the stoichiometric amount of 141 g represented by the following formula (1) on the assumption that all ester groups are converted into amide groups

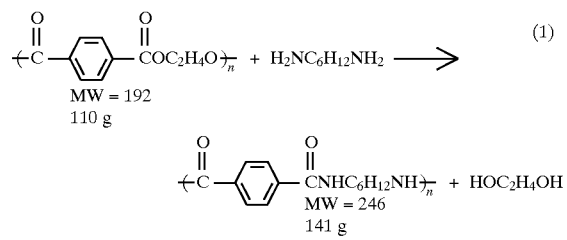

MW = 192
110 g

O            O
        ‖            ‖
    ―(―C―⟨⟩―CNHC₆H₁₂NH―)ₙ + HOC₂H₄OH
              MW = 246
              141 g

The yield exceeded 100% due to the apparent increase of the molecular weight of the reaction product by the addition of the diamine compound.
*2: ratio of the ester groups which were converted into the amide groups obtained according to the following equation; amidation ratio = $\lambda_{1540}/(\lambda_{1730} + \lambda_{1540})$, wherein $\lambda_{1730}$ represents the absorbance of the ester group at 1730 cm$^{-1}$ and $\lambda_{1540}$ represents the absorbance of the amide group at 1540 cm$^{-1}$, which absorbance values were measured by FT-IR device using a pellet formed from a mixture of each polyamide resin (A) and KBr
*3: The melting point Tm was measured by using TGA thermal analyzer ("SSC/5200, TG/DTA220" available from SEIKO CO., Ltd., Japan) in an atmosphere of nitrogen with a temperature rise at a rate of 10° C./minute.

As is apparent from the results indicated in TABLE 1, when the PET resin each having the intrinsic viscosity of higher than 0.2 dl/g were used, the melting point and the intrinsic viscosity of each of the obtained polyamide resins (A) were relatively high. Further, the intrinsic viscosity of each polyamide resin (A) was considerably increased by the solid-polycondensation or the melt-polycondensation. It is noted that the polyamide resins (C) obtained by the melt-polycondensation of the polyamide resins (A) exhibited significantly increased intrinsic viscosity.

When the PET resin having an intrinsic viscosity lower than 0.2 dl/g was used (in Comparative example 1) and dimethyl terephthalate was used in place of the PET resin (in Comparative example 2), the obtained polyamide resins (A) had considerably low values of the yield and the intrinsic viscosity as well as low melting points. The intrinsic viscosity of these polyamide resins (A) in Comparative examples 1 and 2 did not substantially change even after the solid-polycondensation or the melt-polycondensation.

Figure 2:
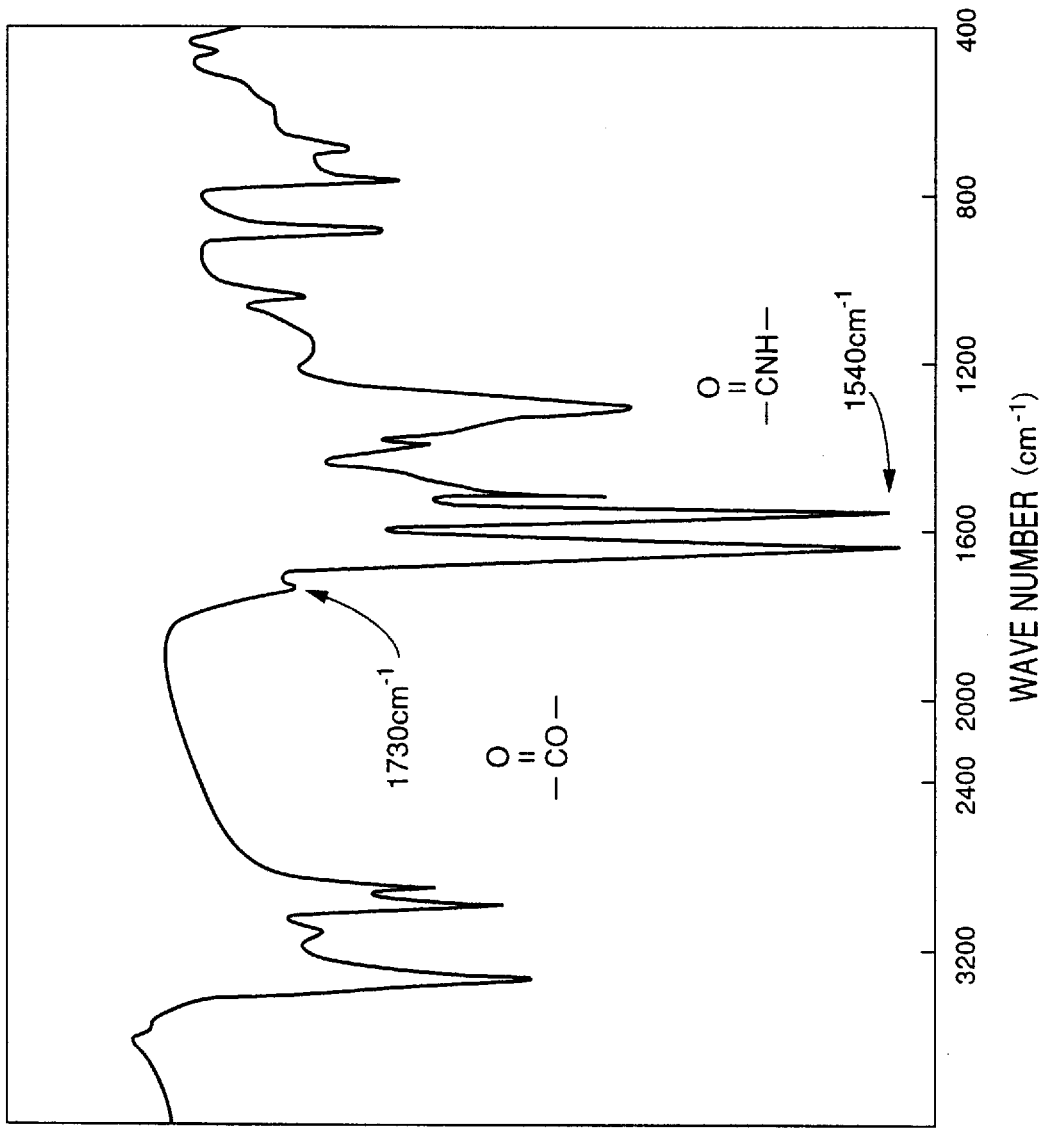
FIG. 2 is a view showing an FT-IR spectrum of the polyamide resin (A) obtained in Example 2.
Figure 3:
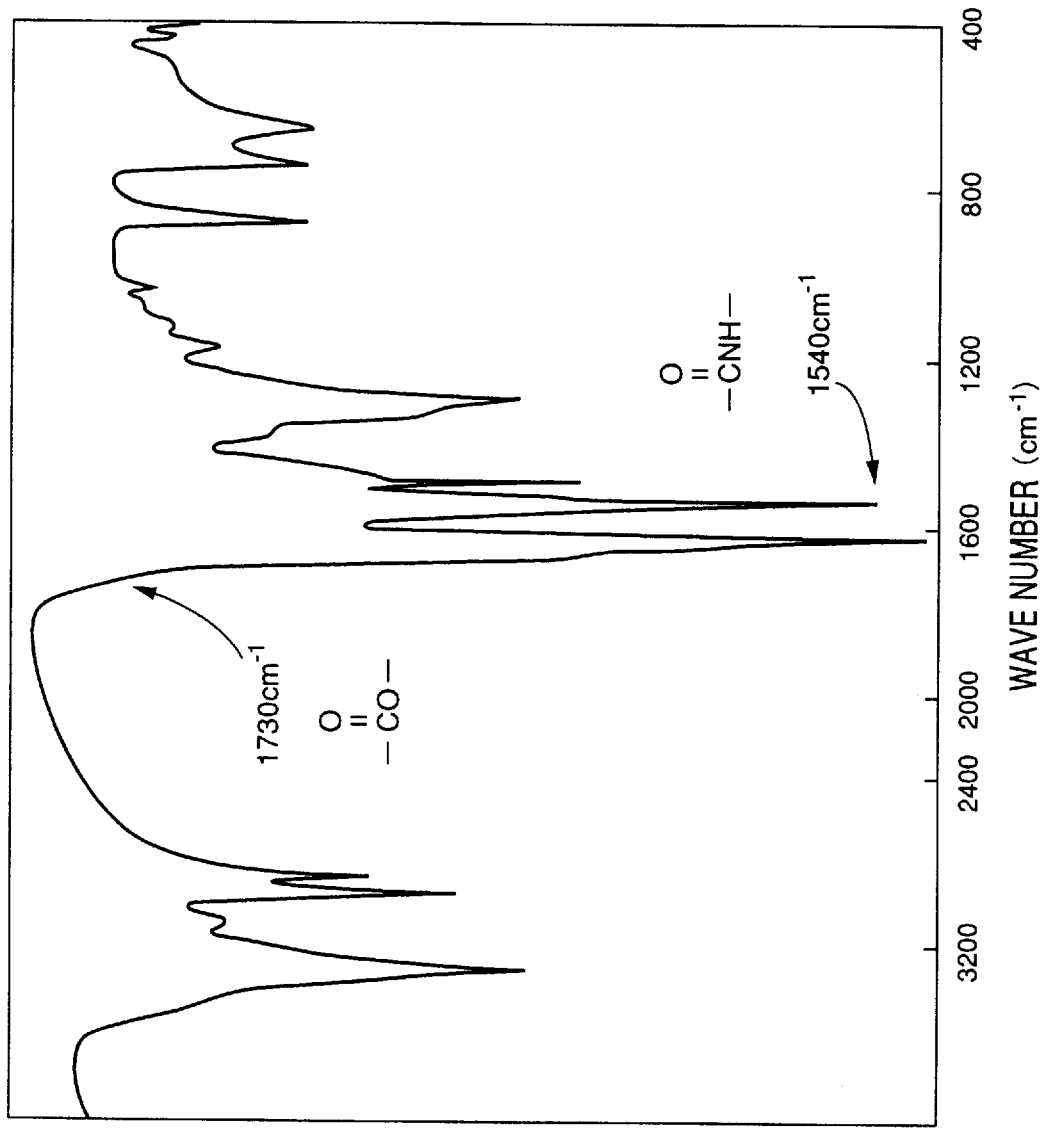
FIG. 3 is a view showing an FT-IR spectrum of nylon 6T.

FIG. 1 shows an FT-IR spectrum of the recycled PET resin obtained by pulverizing the commercially available PET bottles as described above while FIG. 2 shows an FT-IR spectrum of the polyamide resin (A) obtained in Example 2. The absorption by the ester group (—COO—) at the wave number band (1730 cm$^{-1}$) in the FT-IR spectrum of FIG. 1 is substantially eliminated in the FT-IR spectrum of FIG. 2, whereas the absorption by the amide group (—CONH—) at the wave number band (1540 cm$^{-1}$) is recognized in the spectrum of FIG. 2. Further, it is noted that the FT-IR spectrum of FIG. 2 is very similar to the FT-IR spectrum (as shown in FIG. 3) of nylon 6T as the desired polyamide resin obtained by the reaction of the terephthalic acid and HMD. Thus, it is confirmed that the PET resin reacts with HMD according to the present invention, so that the ethylene glycol component in the PET resin is skillfully substituted with HMD, to thereby provide the polyamide resin having a high molecular weight in the form of nylon 6T.

<Examples 5–8 and Comparative examples 3–6>

110 g of the recycled PET resin used in the above Example 2 reacted with HMD at different molar ratio values of HMD, under the same condition as in Example 2, except that the amount of ODCB as the solvent is adjusted such that the total amount of ODCB and HMD is equal to 733 g. The results are shown in TABLE 2 and FIG. 4.

TABLE 2

|  |  |  | Examples | | | | Comparative examples | | | |
|---|---|---|---|---|---|---|---|---|---|---|
|  | molar ratio of HMD |  | 5<br>0.5 | 6<br>0.8 | 7<br>1.2 | 8<br>1.5 | 3<br>0.1 | 4<br>0.2 | 5<br>2.0 | 6<br>3.0 |
| Polyamide resin | A | yield (g) | 116 | 133 | 142 | 136 | 105 | 99 | 131 | 101 |
|  |  | (% *1) | (92) | (99) | (101) | (96) | (93) | (85) | (93) | (72) |
|  |  | amidation ratio | 0.45 | 0.73 | 1.0 | 1.0 | 0.08 | 0.19 | 1.0 | 1.0 |
|  |  | intrinsic viscosity [η] | 0.35 | 0.40 | 0.41 | 0.34 | 0.18 | 0.15 | 0.20 | 0.15 |
|  |  | melting point Tm (°C.) | 265 | 278 | 301 | 305 | 238 | 248 | 305 | 250 |
|  | B | intrinsic viscosity [η] | 0.45 | 0.48 | 0.53 | 0.44 | 0.25 | 0.20 | *2 | *2 |
|  |  | melting point Tm (°C.) | 269 | 281 | 305 | 306 | 240 | 249 | 305 | 254 |
|  | C | intrinsic viscosity [η] | 0.68 | 0.72 | 0.84 | 0.51 | 0.26 | 0.22 | *2 | *2 |
|  |  | melting point Tm (°C.) | 269 | 283 | 306 | 308 | 242 | 249 | 306 | 255 |

*1: When the molar ratio of HMD is less than 1.0, the yield is represented by percentage obtained by using, as the stoichiometric amount, 110 + (141 − 110) × the molar ratio. When the molar ratio of HMD is more than 1.0, the yield is represented by percentage obtained by using 141 as the stoichiometric amount.
*2: The polyamide resin was not dissolved in HFIP.

Figure 4:
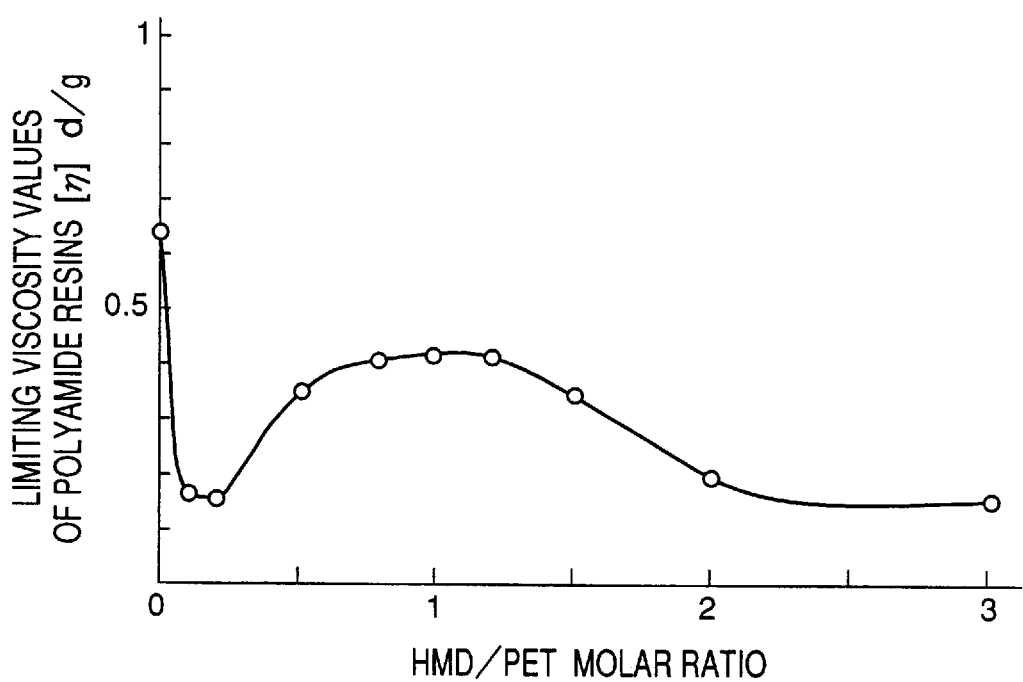
FIG. 4 is a graph showing intrinsic viscosity values of the polyamide resins (A) obtained at different molar ratio values of HMD with respect to the PET resin in Examples 2, 5–8 and Comparative examples 3–6.

As is apparent from the results indicated in TABLE 2 and FIG. 4, when the molar ratio of the HMD with respect to the PET resin was in the range of 0.5–1.5 (in Examples 5–8), the yield of each polyamide resin (A) was large. Further, each of the obtained polyamide resins (A) had a high intrinsic viscosity and a high melting point. It is also understood from the results that the polyamide resins (B) and (C) obtained by the solid-polycondensation or the melt-polycondensation of the polyamide resins (A) exhibited further enhanced results.

On the other hand, when the molar ratio of the HMD with respect to the PET resin was less than 0.5 (in Comparative examples 3 and 4), the polyamide resins (B) and (C) had low intrinsic viscosity even after the solid-polycondensation or the melt-polycondensation was effected. Further, the melting points of those polyamide resins were lower than the melting point of the recycled PET resin powder obtained from the commercially available PET bottles. When the molar ratio of the HMD exceeded 1.5 (in Comparative examples 5 and 6), the obtained polyamide resins (A) had low values of yield and intrinsic viscosity. Further, the polyamide resins (B) and (C) obtained by the solid-polycondensation or the melt-polycondensation were not dissolved in HFIP.

<Examples 9–12 and Comparative examples 7–9>

The recycled PET resin reacted with the HMD in the same manner as in Example 2, except that various kinds of the solvents were used in place of the ODCB. The results are shown in TABLE 3.

Example 2, except that 126 g of PBT was used in Example 14. The results are shown in TABLE 4.

TABLE 4

|  |  |  | Examples | |
|---|---|---|---|---|
|  |  |  | 13 | 14 |
| polyester |  |  | PIFG-5 *1 | PBT *2 |
| Polyamide resin | A | yield (g) | 138 | 139 |
|  |  | (%) | (98) | (99) |
|  |  | amidation ratio | 0.95 | 0.95 |
|  |  | intrinsic viscosity [η] | 0.42 | 0.47 |
|  |  | melting point Tm (°C.) | 275 | 301 |
|  | B | intrinsic viscosity [η] | 0.60 | 0.58 |
|  |  | melting point Tm (°C.) | 280 | 305 |

TABLE 3

|  |  |  | Examples | | | | Comparative examples | | |
|---|---|---|---|---|---|---|---|---|---|
|  |  |  | 9 | 10 | 11 | 12 | 7 | 8 | 9 |
|  | solvent |  | toluene | n-hexane | cyclohexane | THF | ethanol | MEK | water |
| Polyamide resin | A | yield (g) | 138 | 139 | 139 | 131 | 51 | 70 | 25 |
|  |  | (%) | (98) | (99) | (99) | (93) | (42) | (50) | (18) |
|  |  | amidation ratio | 0.94 | 0.93 | 0.93 | 0.95 | 0.88 | 0.85 | 0.92 |
|  |  | intrinsic viscosity [η] | 0.39 | 0.38 | 0.40 | 0.38 | 0.11 | 0.18 | 0.08 |
|  |  | melting point Tm (°C.) | 299 | 295 | 295 | 297 | 260 | 280 | 270 |
|  | B | intrinsic viscosity [η] | 0.50 | 0.51 | 0.52 | 0.50 | 0.13 | 0.20 | 0.10 |
|  |  | melting point Tm (°C.) | 300 | 298 | 299 | 299 | 261 | 283 | 272 |
|  | C | intrinsic viscosity [η] | 0.82 | 0.85 | 0.82 | 0.78 | — | — | — |
|  |  | melting point Tm (°C.) | 302 | 302 | 300 | 301 | — | — | — |

As is apparent from the results indicated in TABLE 3, when the hydrocarbons such as toluene and n-hexane and the ethers such as THF (tetrahydrofuran) were used as the solvent, the obtained polyamide resins exhibited excellent characteristics similar to those of the polyamide resins obtained by using the ODCB as the reaction medium.

On the other hand, the obtained polyamide resins undesirably had low values of yield, amidation ratio and intrinsic viscosity when ethanol and water which hydrolyze the PET resin were used as the reaction medium and when MEK (methylethylketone) which reacts with the diamine compound was used as the reaction medium. In these cases, the intrinsic viscosity of the polyamide resins did not increase even after the polyamide resins were subjected to the solid-polycondensation or the melt-polycondensation.

<Examples 13 and 14>

In place of the PET resin as used in Example 2, copolymer PET (PIFG-5) and polybutyleneterephthalate (PBT) were used as the polyester resin in Examples 13 and 14, respectively. The reaction was effected in the same manner as in TABLE 4-continued

|  |  | Examples | |
|---|---|---|---|
|  |  | 13 | 14 |
| polyester |  | PIFG-5 *1 | PBT *2 |
| C | intrinsic viscosity [η] | 0.90 | 0.99 |
|  | melting point Tm (°C.) | 283 | 306 |

*1:copolymer PET available from KANEBO CO., Ltd., Japan
[η] = 0.80 dl/g
Tm = 240° C.
acid component: terephthalic acid/ isophthalic acid = 95/5 (mole %)
*2:"Novadule 5010" available from MITSUBISHI KAGAKU CO., Ltd.

As is apparent from the results indicated in TABLE 4, the obtained polyamide resins exhibited excellent characteristics as described above even when the different kinds of the polyester resins were used.

<Examples 15–19>

In place of the HMD as used in Example 2, various kinds of the diamine compounds were used for the amidation of the PET resin. As the aliphatic diamine compounds, there were respectively used butane diamine (hereinafter referred to as "BDA", available from WAKO JUNYAKU CO., Ltd.) in Example 15, octane diamine (hereinafter referred to as "ODA", available from WAKO JUNYAKU CO., Ltd.) in Example 16 and a mixture of the BDA and the ODA in a molar proportion (ratio) of 1:1 in Example 17. As the aromatic diamine compound, p-phenylenediamine (hereinafter referred to as "PDA", available from WAKO JUNYAKU CO., Ltd.) was used in Example 18. The PDA was used in an amount of 1.2 mol for 1 mol of the PET resin as caluclated in the repeating unit. In this example 18, linear dodecyl benzene, hereinafter referred to as "SDB", ("ALKYLBENZENE AB-SG" available from MITSUBISHI KAGAKU CO. Ltd.) was used as the reaction medium. The reaction was effected at 210° C. The reaction product was washed with a large amount of acetone. The reaction product was subjected to the solid-polycondensation at 240° C. for 2 hours at a reduced pressure of 1 Torr. The other conditions for the reaction were the same as in Example 2. In Example 19, 1,2-diaminocyclohexane (hereinafter referred to as "DACH", available from WAKO JUNYAKU CO. Ltd.) was used as the alicyclic diamine compound. The reaction in this Example 19 was effected in the same manner as in Example 18, except that the solid-polycondensation was effected at 200° C. for 3 hours at a reduced pressure of 1 Torr. The results are shown in TABLE 5.

TABLE 5

| | | | Examples | | | |
|---|---|---|---|---|---|---|
| | | | 15 | 16 | 17 | 18 | 19 |
| | | diamine | BDA | ODA | BDA + ODA | PDA | DACH |
| Polyamide resin | A | yield g (%) | 122 (98) | 156 (99) | 147 (99) | 152*1 (112) | 119*2 (85) |
| | | amidation ratio | 0.94 | 0.92 | 0.90 | 0.85 | 0.78 |
| | | intrinsic viscosity [η] | 0.38 | 0.39 | 0.38 | 0.30*3 | 0.25 |
| | | melting point Tm (°C.) | 320 | 280 | 303 | 310 | none |
| | B | intrinsic viscosity [η] | 0.50 | 0.51 | 0.53 | 0.45*3 | 0.40 |
| | | melting point Tm (°C.) | 323 | 285 | 306 | 340 | none |
| | C | intrinsic viscosity [η] | — | 0.85 | 0.83 | — | — |
| | | melting point Tm (°C.) | — | 287 | 309 | — | — |

*1: percentage obtained by dividing the yield (g) by the stoichiometric amount of 136 g represented by the following formula (2) on the assumption that all ester groups are converted into amide groups

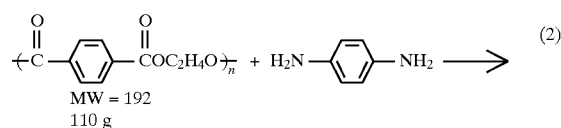

MW = 192
110 g

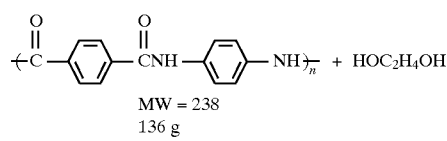

MW = 238
136 g

*2: percentage obtained by dividing the yield (g) by the stoichiometric amount of 140 g represented by the following formula (3) on the assumption that all ester groups are converted into amide groups $$\text{(3)}$$

MW = 192
110 g

MW = 244
140 g

*3: The intrinsic viscosity was measured at 30° C. by the Ubbelohde viscometer, using concentrated sulphuric acid as the solvent.

As is apparent from the results of TABLE 5, the amidation proceeded substantially stoichiometrically when the aliphatic diamine compounds were used in the reaction according to the present invention. The intrinsic viscosity of the obtained polyamide resins (A) was increased after the solid-polycondensation or the melt-polycondensation. The obtained polyamide resin had a desired melting point by using the mixture of the two kinds of the diamine compounds.

When the aromatic diamine compounds were used in the reaction according to the present invention, polymers were easily obtained which had high values of melting point and yield though the amidation and the intrinsic viscosity were low in comparison with those in the aliphatic diamine compounds. This is because the aromatic diamines have lower reactivity to ester-group than the aliphatic diamines. When the alicyclic diamines were used in the reaction according to the present invention, polymers were easily obtained which were amorophous polyamide resins.

According to the present method for producing the polyamide resin, the linear polyester resin which is used in place of the organic dicarboxylic acid conventionally used for producing the polyamide resin reacts with, in the predetermined solvent, the diamine compound whose molar ratio is determined to be in the range of 0.5–1.0 for the polyester resin, whereby the desired polyamide resin is advantageously obtained in a simplified manner in a relatively short period time. Further, the obtained polyamide resin is subjected to the solid-polycondensation or the melt-polycondensation so that the intrinsic viscosity of the polyamide resin is increased to a sufficiently high level suitable for practical use of the polyamide resin.

In the present invention, the waste PET resin can be used as the material in the reaction as described above. Thus, the present method is capable of advantageously producing the polyamide resin having a high added value, at a reduced cost in a simplified manner.

<Example 20>

Commercially available bottles made of the PET resin were collected and washed. Then, the PET bottles were pulverized and passed through a 10-mesh sieve. The thus obtained PET resin which passed through the sieve was dried at 130° C. for three hours. The dried PET resin powder was measured of its water content by using a measuring device (available from MITSUBISHI KAGAKU CO., Ltd., Japan). The water content of the PET resin powder was 100 ppm.

110 g of the PET resin powder was introduced into a 1 L autoclave together with 66 g of hexamethylenediamine (HMD) and 667 g of dodecylbenzene (linear) available from MITSUBISHI KAGAKU CO., Ltd., Japan. After the atmosphere in the autoclave was substituted with the nitrogen gas, the autoclave was pressure-tightly closed and heated while the mixture in the autoclave was stirred. The mixture was held at 180° C. for seven hours. Thereafter, the autoclave was evacuated by a vacuum pump to 150 mmHg, whereby ethylene glycol as a by-product of the reaction was taken out of the reaction system. In this condition, the mixture was heated at 180° C. for more three hours. After the temperature of the autoclave was lowered to room temperature, the obtained reaction product was subjected to filtration, and washed with a large amount of ethanol. Then, the reaction product was again subjected to filtration, and dried at 120° C. for twenty four hours, whereby a desired polyamide resin was obtained. The yield (%) of the obtained polyamide resin was 100% which was obtained by dividing the yield (g) of the polyamide resin by the stoichiometric amount of 141 g represented by the above formula (1) on the assumption that all ester groups were converted into the amide groups.

<Comparative example 10>

The same materials as used in Example 20 were put into a 1 L autoclave. After the atmosphere in the autoclave was substituted with the nitrogen gas, the autoclave was pressure-tightly closed, and heated while the mixture in the autoclave was stirred. The mixture was held at 180° C. for seven hours. Subsequently, the autoclave was heated for more three hours at 180° C. without being evacuated. The obtained reaction product was subjected to filtration as effected in Example 20, whereby a desired polyamide resin was obtained. The yield of the obtained polyamide resin calculated in the same manner as in Example 20 was 103%.

<Example 21>

110 g of the PET resin powder as used in Example 20 was put into a 1 L autoclave together with 74 g of p-phenylenediamine and 667 g of dodecylbenzene (linear) as the solvent. The molar amount of PDA is 1.2 times that of the PET resin as calculated in repeating unit of the PET resin. After the atmosphere in the autoclave was substituted with the nitrogen gas, the autoclave was pressure-tightly closed. The mixture in the autoclave was heated at 210° C. for ten hours. Thereafter, the autoclave was opened, and the nitrogen gas was introduced into the autoclave, whereby ethylene glycol as a by-product of the reaction was taken out of the reaction system. In this condition, the autoclave was heated at 210° C. for more ten hours. After the reaction product was subjected to filtration, it was washed with a large amount of acetone. Then, the reaction product was again subjected to filtration, to thereby provide a desired polyamide resin.

The yield (%) of the polyamide resin was obtained by dividing the yield (g) of the obtained polyamide resin by the stoichiometric amount of 136 g represented by the above formula (2). The yield was 110%.

<Comparative example 11>

The same materials as used in Example 21 were introduced into a 1 L autoclave. After the atmosphere in the autoclave was substituted with the nitrogen gas, the autoclave was pressure-tightly closed, and heated at 210° C. for ten hours. The autoclave was heated for more ten hours at 210° C. while the autoclave was kept closed. Thereafter, the reaction product was subjected to filtration as effected in Example 20, whereby a desired polyamide resin was obtained. The yield (%) of the polyamide resin calculated in the same manner as in Example 21 was 112%.

For the polyamide resins in the form of powder obtained in Examples 20 and 22 and in Comparative examples 10 and 11, the physical properties were examined. The results are indicated in TABLE 6.

[amidation ratio]

The amidation ratio represents a ratio of the ester groups which were converted into the amide groups obtained according to the following equation;

amidation ratio (%)=$\lambda_{1540}/(\lambda_{1730}+\lambda_{1540})\times 100$, wherein $\lambda_{1730}$ represents the absorbance of the ester group at 1730 $cm^{-1}$ and $\lambda_{1540}$ represents the absorbance of the amide group at 1540 $cm^{-1}$, which absorbance values were measured by FT-IR device ("1725X" available from PERKIN ELMER, U.S.A.), using a pellet formed from a mixture of each polyamide resin (A) and KBr.

[melting point (Tm)]

The melting point Tm was measured in the same manner as specified in *3 under TABLE 1.

[intrinsic viscosity]

The intrinsic viscosity was measured at 30° C. by using the Ubbelohde viscometer, using, as the solvent, hexafluoroisopropanol in Example 20 and Comparative example 10, and concentrated sulphuric acid in Examples 21 and Comparative example 11.

TABLE 6

|  | Examples | | Comparative examples | |
| --- | --- | --- | --- | --- |
|  | 20 | 21 | 10 | 11 |
| diamine compound | HMD | PDA | HMD | PDA |
| yield (%) | 100 | 110 | 103 | 112 |
| amidation ratio (%) | 100 | 99 | 95 | 85 |
| intrinsic viscosity (dl/g) | 0.51 | 0.50 | 0.42 | 0.30 |
| melting point Tm (°C.) | 320 | 345 | 300 | 310 |

As is apparent from the results indicated in TABLE 6, the polyamide resin obtained in Example 20 had higher values of amidation ratio and intrinsic viscosity since the autoclave (reaction container) was evacuated so that the ethyleneglycol (the diol component) as the by-product of the reaction was removed from the reaction system. In contrast, the polyamide resin obtained in Comparative example 10 wherein the autoclave was not evacuated had a low amidation ratio and a low intrinsic viscosity. Similarly, the polyamide resin obtained in Example 21 had higher degrees of amidation ratio and intrinsic viscosity since the autoclave was opened and heated at a temperature higher than the boiling point of the ethyleneglycol (197° C.), so that the ethyleneglycol was removed from the reaction system. On the other hand, the polyamide resin obtained in Comparative example 11 wherein the autoclave was kept closed had a low amidation ratio and a low intrinsic viscosity.

It is to be understood from the above description that the diol component as the by-product of the reaction is removed from the reaction system according to the present invention, so that the amidation ratio and the molecular weight (intrinsic viscosity) of the obtained polyamide resin can be effectively increased. Thus, the polyamide resin having a sufficiently high molecular weight can be obtained in a simplified manner according to the present invention.

<Examples 22–23 and Comparative examples 12–13>

Initially, there were prepared three specimens (1), (2) and (3) of the PET resin powder in the following manner. Commercially available bottles made of the PET resin were collected and washed. Then, the PET bottles were pulverized and passed through a 10-mesh sieve. The thus obtained PET resin powder which had passed through the sieve was used as the specimen (1). The specimen (2) was obtained by drying the obtained PET resin specimen (1) at 130° C. for one hour while the specimen (3) was obtained by drying the obtained PET resin powder at 130° C. for 5 hours. The water content of each specimen of the PET resin powder was measured by a measuring device (available from MITSUB-ISHI KAGAKUCO., Ltd., Japan). The water contents of the specimens (1), (2) and (3) were 3100 ppm, 600 ppm, and 15 ppm, respectively.

Next, there were prepared two mixed reaction media (4) and (5) by dissolving 1 part by weight of HMD (the diamine compound) in 10 parts by weight of ODCB (the solvent). The obtained mixed reaction media were dehydrated using a molecular sieve 3A (available from WAKO JUNYAKU CO., Ltd., Japan) at different conditions, so as to provide the mixed reaction medium (4) whose water content is 300 ppm and the mixed reaction medium (5) whose water content is 15 ppm.

110 g of each of the PET resin powder specimens (1)–(3) was introduced into each 1 L autoclave together with 733 g of one of the mixed reaction media (4) and (5) which contain an equivalent molar amount of HMD for the PET resin as calculated in repeating unit of the PET resin. The combination of each PET resin powder specimen and each mixed reaction medium is indicated in TABLE 7. After the atmosphere in each autoclave was substituted with the nitrogen gas, the autoclave was pressure-tightly closed, and heated while the mixture in the autoclave was stirred. The mixture was held at 180° C. for 10 hours. After the temperature of the autoclave was lowered to room temperature, the obtained reaction product was separated by filtration and washed with a large amount of ethanol. Then, the reaction product was again subjected to filtration. Thereafter, the reaction product was vacuum-dried at 120° C. for 24 hours, whereby a desired polyamide resin was obtained. The yield (%) of each of the obtained polyamide resins was obtained by dividing the yield (g) of each polyamide resin by the stoichiometric amount of 141 g represented by the above formula (1), on the assumption that all ester groups were converted into amide groups.

Each of the thus obtained polyamide reins in the form of powder was examined of its physical properties. The results are indicated in TABLE 7.

The physical properties of each polyamide resin was obtained in the following manner.

[amidation ratio]

The amidation ratio was obtained in the same manner as specified in Examples 20–21 and Comparative examples 10–11.

[melting point (Tm)]

The melting point Tm was obtained in the same manner as specified in Examples 20–21 and Comparative examples 10–11.

[intrinsic viscosity]

The intrinsic viscosity was measured at 30° C. by using the Ubbelohde viscometer, using HFIP as the solvent.

TABLE 7

| | | water content | Examples | | Comparative examples | |
|---|---|---|---|---|---|---|
| | | (ppm) | 22 | 23 | 12 | 13 |
| PET resin powder | (1) | 3100 | — | — | — | 110 g |
| | (2) | 600 | — | 110 g | 110 g | — |
| | (3) | 15 | 110 g | — | — | — |
| mixed reaction medium | (4) | 300 | — | — | 733 g | 733 g |
| | (5) | 15 | 733 g | 733 g | — | — |
| total water content in the reaction system for PET resin (ppm) | | | 114 | 700 | 2010 | 5070 |
| physical properties | yield (%) | | 99 | 101 | 90 | 88 |
| | amidation ratio (%) | | 97 | 97 | 90 | 85 |
| | intrinsic viscosity*1 (dl/g) | | 0.51 | 0.45 | 0.25 | 0.20 |
| | melting point Tm (°C.) | | 310 | 305 | 301 | 296 |

*1: The intrinsic viscosity was measured at 30° C. by using HFIP as the solvent.

As is apparent from the results indicated in TABLE 7, the polyamide resins obtained in Examples 22, 23 wherein the total water contents in the reaction systems were less than 1000 ppm for the polyester resin had higher degrees of amidation ratio and intrinsic viscosity than the polyamide resins obtained in Comparative examples 12, 13 wherein the total water contents in the reaction systems exceeded 1000 ppm.

According to the present invention, the total water content in the reaction system is controlled to not more than 1000 ppm for the linear polyester resin in the amidation of the linear polyester resin, to thereby effectively increase the amidation ratio and the molecular weight (intrinsic viscosity) of the obtained polyamide resin while avoiding its gelation. Thus, the present method is capable of producing, in a simplified manner, the polyamide resin having a high molecular weight suitable for practical use.

What is claimed is:

1. A method of producing a polyamide resin by reacting 1 mol of linear polyester resin based upon the repeating unit of said linear polyester resin consisting of at least one dicarboxylic acid component and at least one diol component and having an intrinsic viscosity of not less than 0.2 dl/g when measured at 30° C. using hexafluorisopropanol as the solvent with 0.5–1.5 mol of at least one diamine compound in a reaction medium comprising at least one solvent selected from the group consisting of hydrocarbons, halogenated hydrocarbons, ethers and acetals, so that said at least one diol component of said linear polyester resin is substituted by said diamine compound resulting in said polyamide resin as a reaction product.

2. A method according to claim 1 further comprising a step of effecting polycondensation under solid state or molten state so as to increase a degree of polymerization of said reaction product.

3. A method according to claim 2, wherein said polycondensation under molten state is effected at a reduced pressure by applying a shearing force to said reaction product while said reaction product is maintained in a molten state.

4. A method according to claim 1 further comprising a step of removing said at least one diol component from a reaction system of said linear polyester resin and said diamine compound, which diol component is produced as a by-product during a reaction of said linear polyester resin and said diamine compound.

5. A method according to claim 4, wherein said step of removing said at least one diol component is effected at a reduced pressure by evacuation of said reaction system.

6. A method according to claim 4, wherein said step of removing said at least one diol component is effected by heating said reaction system at a temperature higher than a boiling point of said diol component.

7. A method according to claim 4, wherein said step of removing said at least one diol component is effected after addition reaction of said diamine compound to said polyester resin is terminated.

8. A method according to claim 1, wherein said at least one solvent as said reaction medium has a boiling point which is higher than that of said diol component.

9. A method according to claim 1, wherein a total content of water contained in a reaction system of said linear polyester resin, said diamine compound and said reaction medium is not more than 1000 ppm for said linear polyester resin.

10. A method according to claim 9, wherein a content of water contained in said linear polyester resin is not more than 1000 ppm.

11. A method according to claim 9, wherein a content of water contained in said diamine compound is not more than 1000 ppm.

12. A method according to claim 9, wherein a content of water contained in said reaction medium is not more than 1000 ppm.

13. A method according to claim 1, wherein said linear polyester resin is a thermoplastic polyalkylene terephthalate resin.

14. A method according to claim 13, wherein said polyalkylene terephthalate resin is a polyethylene terephthalate resin.

15. A method according to claim 14, wherein said polyethylene terephthalate resin is a recycled polyethylene terephthalate resin.

* * * * *